United States Patent Office 2,784,751
Patented Mar. 12, 1957

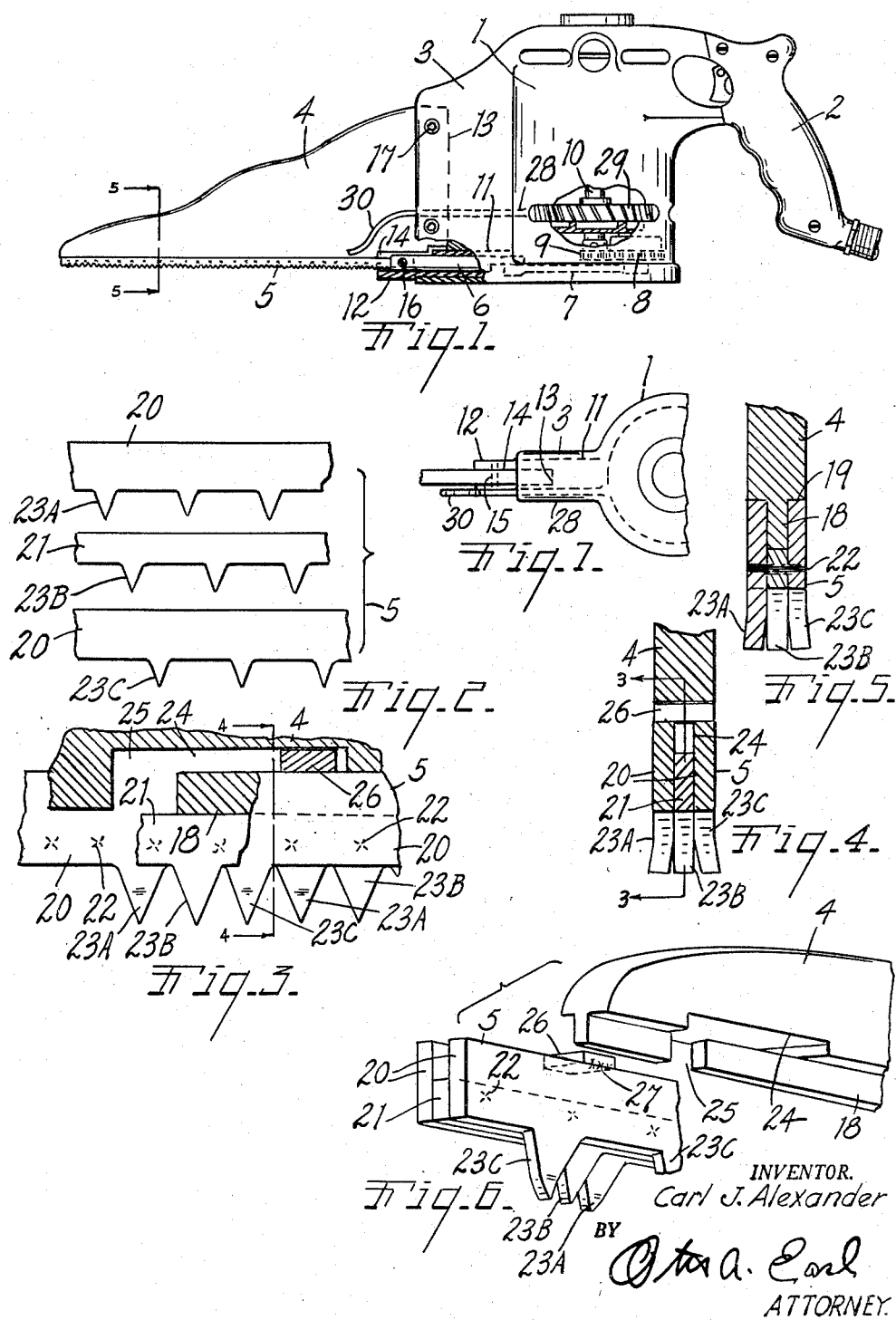

2,784,751

RECIPROCATING SAW WITH LAMINATED BLADE

Carl J. Alexander, Moorepark, Mich.

Application August 3, 1953, Serial No. 371,777

13 Claims. (Cl. 143—68)

This invention relates to improvements in power driven reciprocating saw.

The principal objects of this invention are:

First, to provide a hand operated power driven reciprocating saw in which the point or area of wear between the saw blade and saw backing occurs on the saw blade which is readily replaceable.

Second, to provide a reciprocal saw blade and thin saw backing plate having a tongue and groove sliding engagement and in which the tongue and groove connection is easily and inexpensively formed by laminating the blade.

Third, to provide a saw blade for a reciprocating saw that is inexpensive to manufacture and which is efficient in its cutting action.

Fourth, to provide a laminated saw blade that is easily sharpened and kept in good cutting condition.

Other objects and advantages of the invention will be apparent from a consideration of the following description and claims. The drawings illustrate a highly practical form of the invention.

Fig. 1 is a side elevational view, partially broken away, of a power saw embodying the invention.

Fig. 2 is a fragmentary exploded view of the separate sections of the saw blade.

Fig. 3 is a fragmentary cross sectional view taken along the plane of the line 3—3 in Fig. 4 and showing the interlocking engagement between the saw blade and the saw backing plate.

Fig. 4 is a fragmentary transverse cross sectional view taken along the plane of line 4—4 in Fig. 3.

Fig. 5 is a fragmentary transverse cross sectional view taken along the plane of line 5—5 in Fig. 1 and illustrating the joint between the saw blade and the saw backing plate at a different position from that shown in Fig. 4.

Fig. 6 is a fragmentary exploded perspective view showing the interengageable portions of the saw backing plate and the saw blade.

Fig. 7 is a fragmentary plan view of the saw illustrating details of the connection of the saw backing plate to the motor housing.

The present invention constitutes an improvement on the saw structure disclosed and claimed in my co-pending application for Portable Saw, Serial Number 145,781, filed February 23, 1950, now abandoned. The present saw includes generally a motor housing 1 having a handle 2 projecting from one side thereof and an upright rib 3 on the other side thereof. Removably secured to and projecting from the rib 3 is an elongated tapering backing plate 4 that supports the back edge of a reciprocating saw blade 5. The blade 5 is reciprocated by a plunger 6 journaled in the lower edge of the rib 3 and the bottom of the housing 1. The plunger 6 is connected by the connecting rod 7 to a crank gear 8 and the crank gear is driven from a gear 9 on the bottom of the motor shaft 10.

More specifically the bottom of the rib 3 and the lower portion of the housing 1 are bored as at 11 to receive the bushing 12 that projects outwardly from the rib and housing and in effect forms an extension of the rib and housing. The bushing 12 forms a bearing for the plunger 6. The outer edge of the rib 3 is slotted as at 13 to receive the inner edge of the backing plate 4. The top of the bushing 12 is slotted as at 14 and the slot 14 opens upwardly into the lower end of the slot 13. The outer end of the bushing 12 is transversely bored as in 15 as is the outer end of the plunger 6. The inner end of the blade 5 is received in the slotted end of the plunger and secured thereto by the screw 16 which is accessible through the bore 15 in the properly adjacent position of the plunger 6.

The saw backing plate 4 has its inner edge removably secured in the slotted edge 13 of the rib by screws 17. The lower edge of the plate 4 is ground or machined away on both sides to form a depending tongue 18 with shoulders 19 on each side thereof. The saw blade 5 is of three piece laminated character comprising outer side laminations 20 and a center lamination 21. The side laminations are wider than the center laminations so that when the laminations are bonded together as by welding at 22 or by soldering a slot is formed between the side laminations that receive the tongue 18 on the backing plate 4.

The laminations 20 and 21 are conveniently punched or cut from thin strips of metal so as to have spaced teeth 23-A, B and C on the lower edge thereof. The teeth are spaced on each lamination and the three laminations are lonigtudinally offset so that in the finished blade the teeth 23-A, B and C occur in succession along the length of the blade. Thus each lamination has one-third of the teeth of the entire blade and each lamination cuts only one third of the width of the kerf cut by the saw. The teeth 23-A and 23-C on the side laminations are given a slight outward set but the teeth 23-B are straight. The teeth are sharpened by straight transverse filing and are not beveled. It is thus easy to keep the blade sharp.

Toward the outer end of the backing plate 4, a longitudinal and transverse slot 24 is formed just above the tongue 18 and an entrance slot 25 is formed into the slot 24. The outer ends of the side laminations 20 of the saw blade carry a retaining block 26 welded or brazed in position as at 27 in spaced relationship above the upper edge of the center lamination 21. The block 26 will pass upwardly through the entrance slot 25 and rearwardly into the slot 24 to support the outer end of the saw blade on the backing plate when the inner end of the blade is attached to the plunger 6.

An additional feature of the saw is the provision of a passage or bore 28 in the rib 3 and housing 1 which opens adjacent to the cooling fan 29 of the motor. The blast of cooling air drawn through the motor by the fan 9 is diverted in part through the passage 28 to a small tube 30 that curves downwardly from the rib 3 to adjacent the inner end of the blade 5. The air blast driven through the tube 30 serves to clear the sawdust from the work adjacent to the saw blade and permit the saw to be guided along a saw line located on the work.

Having thus described my invention, what I claim to be new and desire to secure by Letters Patent is:

1. A power driven saw comprising a motor having a case with a handle on one side and a rib on the other side, a backing plate secured in a slot in said rib and projecting therefrom, the lower edge of said plate having its opposite edges cut away to form a central tongue, a saw blade having three laminations disposed with its side laminations lapped alongside said tongue and with its center lamination positioned below said tongue and bearing thereagainst, the lower edges of said laminations having spaced teeth thereon, said laminations and teeth being disposed with longitudinally successive teeth on said blade on successively different laminations, said plate having a longitudinally extending slot and a transverse entrance slot thereto formed therein near the outer end thereof, a cross bar set onto the upper edges of said side laminations and secured thereto and received in said first slot, a plunger reciprocatingly mounted in the lower end of said rib and said housing, the inner end of said blade being removably connected to said plunger, means drivingly connecting said plunger to said motor, a cooling fan connected to said motor, said housing and rib having a passage formed therein and opening to the discharge of said fan, and a tube connected to said passage and extending to adjacent said blade to blow dust from adjacent cuts being made by the blade.

2. A power driven saw comprising a motor having a case with a handle on one side and a rib on the other side, a backing plate secured in a slot in said rib and projecting therefrom, the lower edge of said plate having its opposite edges cut away to form a central tongue, a saw blade having three laminations disposed with its side laminations lapped alongside said tongue and with its center lamination positioned below said tongue, the lower edges of said laminations having spaced teeth thereon, said laminations and teeth being disposed with longitudinally successive teeth on said blade on different laminations, said plate having a longitudinally extending slot and a transverse entrance slot thereto formed therein near the outer end thereof, a cross bar set onto the upper edges of said side laminations and secured thereto and received in said first slot, a plunger reciprocatingly mounted in the lower end of said rib and said housing, the inner end of said blade being removably connected to said plunger and means drivingly connecting said plunger to said motor.

3. A power driven saw comprising a motor having a case with a handle on one side and a rib on the other side, a backing plate secured to said rib and projecting therefrom, the lower edge of said plate having opposite edges cut away to form a central tongue, a saw blade having three laminations disposed with its side laminations lapped alongside said tongue and with its center lamination positioned below said tongue, the lower edges of said laminations having spaced teeth thereon, said laminations and teeth being disposed with the teeth on one lamination spaced longitudinally from teeth on other laminations, means slidably supporting the outer end of said blade on said plate, a plunger reciprocatingly mounted in the lower end of said rib and said housing, the inner end of said blade being removably connected to said plunger, and means drivingly connecting said plunger to said motor.

4. A power driven saw comprising a motor having a case with a handle on one side and a rib on the other side, a backing plate secured to said rib and projecting therefrom, the lower edge of said plate having its opposite edges cut away to form a central tongue, a saw blade having three laminations disposed with its side laminations lapped alongside said tongue and with its center lamination positioned below said tongue, the lower edges of said laminations having spaced teeth thereon, said laminations and teeth being disposed with part of the teeth on one lamination spaced longitudinally from the teeth on different laminations, means slidably supporting the outer end of said blade on said plate, a plunger reciprocatingly mounted on the lower end of said rib and said housing, the inner end of said blade being removably connected to said plunger and means drivingly connecting said plunger to said motor.

5. A power driven saw comprising a motor having a case with a handle on one side and a rib on the other side, a backing plate secured to said rib and projecting therefrom, the lower edge of said plate having its opposite edges cut away to form a central tongue, a saw blade having three laminations disposed with its side laminations lapped alongside said tongue and with its center lamination positioned below said tongue, the lower edges of said laminations having teeth thereon, means slidably supporting the outer end of said blade on said plate, a plunger reciprocatingly mounted in the lower end of said rib and said housing, the inner end of said blade being removably connected to said plunger and means drivingly connecting said plunger to said motor.

6. A power driven reciprocating saw comprising, a motor housing having a handle on one side and a backing plate on the other side, the lower edge of said plate having a central tongue formed therealong, a saw blade having three laminations secured together to form an upwardly opening groove receiving said tongue, the lower edges of said laminations having teeth formed thereon, the teeth of said laminations being spaced and disposed with successive teeth on the blade positioned on different laminations, said plate having a longitudinally extended slot formed therein near the outer end thereof and further having an entrance slot formed therein to said first slot, a cross-piece carried by the side laminations of said blade and slidably received in said first slot, and reciprocating means in said housing connected to the inner end of said blade.

7. A power driven reciprocating saw comprising, a motor housing having a handle on one side and a backing plate on the other side, the lower edge of said plate having a central tongue formed therealong, a saw blade having three laminations secured together to form an upwardly opening groove receiving said tongue, the lower edges of said laminations having teeth formed thereon, said plate having a longitudinally extended slot formed therein near the outer end thereof and further having an entrance slot formed therein to said first slot, a cross-piece carried by the side laminations of said blade and slidably received in said first slot, and reciprocating means in said housing connected to the inner end of said blade.

8. A power driven reciprocating saw comprising, a motor housing having a handle on one side and a backing plate on the other side, the lower edge of said plate having a central tongue formed therealong, a saw blade having three laminations secured together to form an upwardly opening groove receiving said tongue, the lower edges of said laminations having teeth formed thereon, the teeth of said laminations being spaced and disposed with successive teeth on the blade positioned on different laminations, means slidably supporting the outer end of said blade and reciprocating means in said housing connected to the inner end of said blade.

9. A power driven reciprocating saw comprising, a motor housing having a handle on one side and a backing plate on the other side, the lower edge of said plate having a central tongue formed therealong, a saw blade having three laminations secured together to form an upwardly opening groove receiving said tongue, the lower edges of said laminations having teeth formed thereon, means slidably supporting the outer end of said blade on said plate, and reciprocating means in said housing connected to the inner end of said blade.

10. A saw blade comprising, three laminations extending substantially the full length of the blade and secured together at spaced points along the lengths with the center lamination spaced below the tops of the side laminations to form a central groove, the bottom edges of said laminations being co-planar and having spaced teeth thereon, each tooth on one lamination being succeeded longitudinally of the blade by a tooth on each of the other laminations, the teeth on the side laminations being set slightly outwardly and the teeth on the center laminations being straight, and a cross-bar secured between the tops of said side laminations toward one end of said blade and spaced above the center lamination, the other end of said blade being adapted to be connected to a drive member.

11. A saw blade comprising, three laminations extending substantially the full length of the blade and secured together at spaced points along the lengths with the center lamination spaced below the tops of the side laminations to form a central groove, the bottom edges of said laminations having teeth thereon, and a cross-bar secured between the tops of said side laminations toward one end of said blade and spaced above the center lamination, the other end of said blade being adapted to be connected to a drive member.

12. A saw blade comprising, three laminations extending substantially the full length of the blade and secured together at spaced points along the lengths with the center lamination spaced below the tops of the side laminations to form a central groove, the bottom edges of said laminations having spaced teeth thereon, each tooth on one lamination being succeeded longitudinally of the blade by a tooth on each of the other laminations, and a cross-bar secured between said laminations toward one end of said blade and spaced above the center lamination, the other end of said blade being adapted to be connected to a drive member.

13. A saw blade comprising, three laminations extending substantially the full length of the blade and secured together at spaced points along the lengths with the center lamination spaced below the tops of the side laminations to form a central groove, the bottom edges of said laminations having spaced teeth thereon, each tooth on one lamination being succeeded longitudinally of the blade by a tooth on each of the other laminations.

References Cited in the file of this patent

UNITED STATES PATENTS

| | | |
|---|---|---|
| 1,537,980 | Asselin | May 19, 1925 |
| 1,838,125 | Wirtz | Dec. 29, 1931 |
| 2,573,573 | Jenkins | Oct. 30, 1951 |
| 2,596,481 | Hincks | May 13, 1952 |

FOREIGN PATENTS

| | | |
|---|---|---|
| 68,684 | Germany | May 19, 1893 |
| 233,251 | Great Britain | May 7, 1925 |
| 55,441 | Norway | July 15, 1935 |
| 564,152 | Great Britain | Sept. 14, 1944 |